March 25, 1941.  P. WEIEN  2,236,280

DRIVE FOR SIGNAL SWITCHES

Filed Nov. 22, 1939

Inventor:
Paul Weien
By Dike, Calver & Gray
Attorneys.

Patented Mar. 25, 1941

2,236,280

UNITED STATES PATENT OFFICE 2,236,280

DRIVE FOR SIGNAL SWITCHES

Paul Weien, Marietta, Pa., assignor of one-half to Henry S. Rich, Jr., Marietta, Pa.

Application November 22, 1939, Serial No. 305,638

5 Claims. (Cl. 200—59)

This invention relates to direction indicator systems for automotive vehicles, and more particularly to the operation of a switch for opening and closing electrical signal circuits in a vehicle.

The signal switch shown in my copending application, Serial No. 305,637, filed November 22, 1939, comprises a pair of rotatable members having contacts which are disengaged from each other in the neutral position of both members, and engage each other to close right or left turn signal circuits, respectively, on manually turning one of said members, hereafter called "manual member," from its neutral position into two opposite active positions, respectively. The manual member, which is normally spring-urged into its neutral position, is automatically locked in either active position against rotation into its neutral position, and is released when the other member, hereafter called "automatic member," is rotated from its neutral position. The automatic member, which is driven by the steering mechanism of the vehicle, is in its neutral position when the vehicle moves in a straight direction, and is rotated in opposite directions, respectively, when the vehicle turns to the left or right, respectively. After the manual member has been rocked into an active position for closing certain signal circuits and when the vehicle starts to negotiate the indicated turn, the same signal circuits remain closed until the vehicle has substantially completed the turn even though the manual member has in the meantime been spring-returned to its neutral position. This is due to the fact that the automatic member, while being rotated during the negotiation of the indicated turn of the vehicle, keeps the switch contacts of the closed signal circuits engaged substantially until the automatic member is returned to its neutral position when the vehicle proceeds again in a straight direction. However, rotation of the automatic member from and to its neutral position in consequence of a turn of the vehicle never causes the closing of any open signal circuits, but merely results in holding certain signal circuits closed which have previously been closed by the manual member. By slightly changing this switch, however, the same may also automatically close the left or right turn signal circuits, respectively, on rotation of the automatic member from its neutral position in opposite directions, respectively. In that case the switch would operate like the one shown in my prior patent, No. 1,910,869, May 23, 1933.

It is the primary aim and object of the present invention to provide a simple and short driving connection between the steering mechanism of an automotive vehicle and the automatic member of a signal switch, and to mount the switch at such a vantage place that another simple and short driving connection will bring the manual member of the switch into driving relationship with a switch actuator shaft which extends through the hollow steering shaft of the vehicle and is manually rockable by a handle on the hub of the steering wheel.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
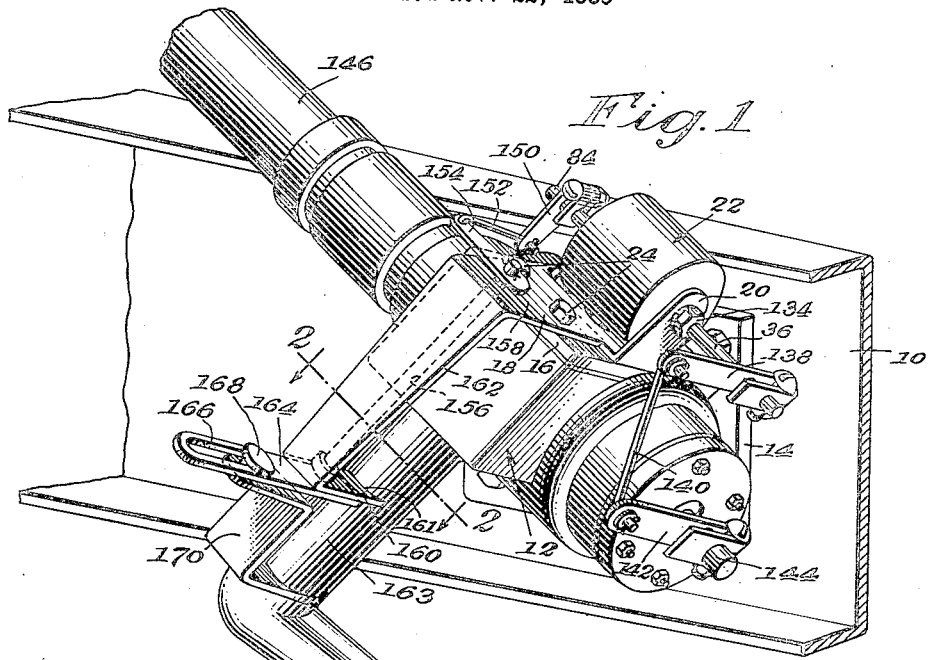
Fig. 1 is a perspective view of a steering gear housing and a signal switch mounted thereon, and embodying one form of my novel driving connection between the switch and the steering mechanism on the one hand and a manual switch actuator on the other hand.

Referring to Fig. 1, the reference numeral 10 designates the frame of an automotive vehicle on which a conventional steering gear housing 12 is mounted through intermediation of any suitable bracket 14. Suitably mounted on a cover plate 16 of the housing 12 is a bracket 18 on whose upturned flange 20 is mounted a signal switch 22. The bracket 18, which is preferably formed of sheet metal, is in the present instance mounted on the cover plate 16 by means of screws 24 which also secure said cover plate to the housing 12.

Figures 3, 4:
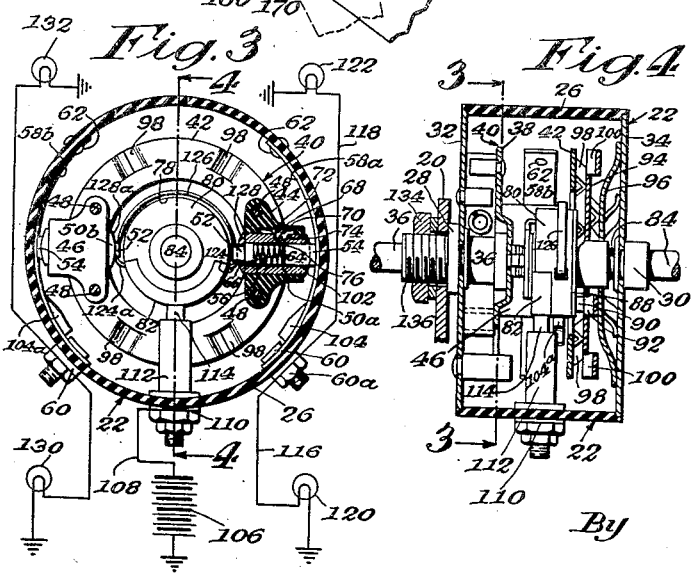
Fig. 3 is a section through the signal switch shown in Fig. 1, the section being taken substantially on the line 3—3 of Fig. 4.
Fig. 4 is a section through the switch taken substantially on the line 4—4 of Fig. 3.

The switch 22 shown in Figs. 1, 3 and 4 is like the one shown in my copending application, Serial No. 305,637 filed November 22, 1939, and comprises a cylindrical housing 26 which is provided with two bearing sleeves 28 and 30 on its opposite end walls 32 and 34, respectively.

Figure 5:
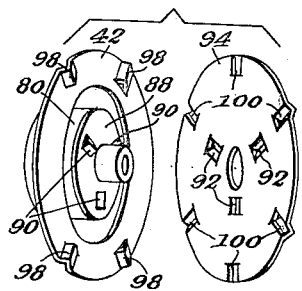
Fig. 5 illustrates perspectively certain disassembled parts of the switch.

Journalled in the bearing sleeve 28 is an axially immovable stub shaft 36 which carries at its inner end an end plate 38 of a brush carrier 40 which includes another end plate 42 and two diametrically opposite brush holders 44 and 46 which are located between the plates 38, 42. These end plates 38, 42 and the brush holders 44, 46 therebetween are secured together by rivets 48 or the like. Guided for radial movement in the brush holders 44, 46 are conductive sleeves 50a and 50b, respectively, each of which receives two brushes 52 and 54 that are urged apart by an interposed spring 56. The outer brushes 54 in the conductive sleeves 50a and 50b are urged into permanent engagement with arcuate conductive tracks 58a and 58b which are secured to the inner cylindrical wall of the switch housing by means of terminals 60 and rivets 62. Each of the inner brushes 52 in the conductive sleeves 50a and 50b is provided with a shoulder 64 which is adapted to engage a shoulder 66 of the sleeve. Received in recesses 68 in the brush holders 44 and 46 are leaf springs 70 whose apexes 72 are adapted to register with either one of two V-shaped notches 74 and 76 in the conductive sleeves 50a and 50b. When the spring apexes 72 register with the notches 74 in the conductive sleeves, the brushes 52 ride on the periphery 78 of a rotor 80, and when the spring apexes 72 register with the notches 76, the brushes 52 are withdrawn from the rotor 80 as shown in Fig. 3. The rotor 80 itself is a disk of any suitable insulating material which is mounted on a stub shaft 84, journalled and suitably held against axial movement in the bearing sleeve 30. Suitably carried by the rotor 80 is an arcuate conductor 82 whose periphery is concentric to, and flush with, the periphery of said rotor. The rotor 80 is also provided with a lock plate 86, having three equiangularly spaced, punched-out cams 90 (see also Fig. 5) which are adapted to register under certain conditions with depressions 92 in a lock disk 94 which are preferably formed by punching out portions of said disk. The lock disk 94 is held non-rotatable and is guided for movement axially of the rotor 80 by means of guide pins (not shown) which project from the end wall 34 of the switch housing, and said disk is normally urged against the plate 88 on the rotor by means of a star spring 96. The end plate 42 of the brush carrier 40 is provided with four punched-out cams 98 (see also Fig. 5) which are adapted to register under certain conditions with depressions 100 in the lock disk 94 that are formed by punching out portions of said disk. The cams 90 and 98 on the rotor and the brush carrier, respectively, as well as the depressions 92 and 100 in the lock disk 94 are of a similar cross-sectional shape so that the depressions 92 and 100 may simultaneously register with the cams 90 and 98, respectively, when the rotor 80 and the brush carrier 40 assume certain angular positions. Thus, in the neutral position of the brush carrier 40 shown in Fig. 3, the cams 98 thereof are displaced 30 degrees from the depressions 100 in the lock disk 94 (Fig. 5), with the result that said lock disk is held depressed. In the neutral position of the rotor shown in Fig. 3, its cams 90 are in alignment with the depressions 92 in the lock disk 94 (Fig. 5), but do not register with the same inasmuch as the cams 98 of the brush carrier hold the lock disk depressed. However, while the rotor 80 is in its neutral position and on rotating the brush carrier 40 from its neutral position (Fig. 3) in either direction through 30 degrees into either of two active positions, the cams 98 of the brush carrier will align with the depressions 100 in the lock disk 94 and the latter is then free to yield to the left as viewed in Fig. 4 and lock the brush carrier as well as the rotor against rotation by virtue of the registry of the cams 90 and 98 with the depressions 92 and 100. Release of the brush carrier 40 from locking engagement with the disk 94 may be accomplished by forcibly rocking the brush carrier from either active position or by turning the rotor 80 from its neutral position. In either case, the lock disk 94 is depressed from locking engagement with the cams 90 and 98 of the rotor and the brush carrier, respectively, as will be readily understood. The brush carrier 40 is normally yieldingly urged into its neutral position in a manner not shown in the drawing but fully disclosed in my mentioned copending application. However, the force which tends to return the brush carrier to its neutral position is insufficient to unlock the brush carrier in either active position.

On rocking the brush carrier 40 from its neutral position clockwise as viewed in Fig. 3, for instance, into one of its two active positions, a follower portion 102 of the conductive sleeve 50a in the brush holder 44 cooperates with a cam 104 in the switch housing which forces said sleeve radially inwardly to such an extent that its notch 74 registers with the spring apex 72 and is held thereby in a position in which its brush 52 engages the rotor conductor 82. When such engagement takes place, two signal circuits are closed which comprise any suitable source of electrical energy such as the storage battery 106, a lead 108, a terminal 110 on the switch housing, a conductive sleeve 112 secured to the switch housing and suitably conductively connected with said terminal, a brush 114 which is received in said sleeve 112 and normally yieldingly urged against the conductor 82, the conductor 82 itself, sleeve 50a with its brushes 52 and 54, the conductive track 58a and the terminal 60a from which leads 116 and 118, respectively, pass to grounded light bulbs 120 and 122, respectively. The bulbs 120 and 122 may be mounted in special lamp housings on the right side, for instance, and in the rear and front, respectively, of the vehicle, and light may be emitted from these lamp housings through arrow-shaped windows that point to the right for indicating a right turn. Two more bulbs 130 and 132 are mounted in similar lamp housings at the left side and in the rear and front, respectively, of the vehicle. The signal circuits through these bulbs are closed in a self-evident manner on rocking the brush carrier 40 from its neutral position counterclockwise as viewed in Fig. 3, whereupon another cam 104a in the switch housing functions to move the conductive sleeve 50b into its inner position in which its brush 52 is in engagement with the rotor conductor 82. Instead of using special signal bulbs, the conventional stop light and parking light bulbs in an automotive vehicle may be used for sending signals in a manner shown and described in my co-pending application, Serial No. 298,793, filed October 10, 1939.

The rotor 80 is so drivingly connected with the steering mechanism of the vehicle in a manner to be described hereinafter, that said rotor is turned counter-clockwise as viewed in Fig. 3 when the vehicle turns to the right, and is turned clockwise when the vehicle turns to the left. Hence, on rocking the brush carrier 40 for closing the right turn signal circuits, for instance, before the vehicle actually negotiates the indicated turn, the brush carrier 40 becomes locked in its corresponding active position, as will be readily understood. The rotor 80 is turned from its neutral position counter-clockwise as viewed in Fig. 3 as soon as the vehicle negotiates a right turn, with the result that the brush carrier 40 is released from the locking plate 94 and spring-returned to its neutral position. However, the return of the brush carrier 40 to its neutral position does not cause opening of the right turn signal circuits because the rotor 80 has in the meantime been sufficiently rotated in a counterclockwise direction as viewed in Fig. 3 that the conductor 82 remains in engagement with the brush 52 in the conductive sleeve 50a. The steering mechanism of the vehicle will return the rotor 80 to its neutral position, in a manner to be described hereinafter, when the vehicle resumes its straight direction of movement after negotiating the right turn. Shortly before the rotor 80 is thus returned to its neutral position, a lobe 124 of a cam 126 on said rotor cooperates with another follower portion 128 of the conductive sleeve 50a and forces the latter into its outer position (Fig. 3) in which the spring apex 72 again registers with the notch 76 and the brush 52 is withdrawn from the rotor. The cam 126 is suitably mounted in the insulating rotor 80 and has another lobe 124a which is adapted to cooperate with the follower portion 128a of the conductive sleeve 50b in the other brush holder 46 when the switch has been set for a left turn indication.

Suppose the driver of the automobile sets the switch for a right turn indication and then negotiates a left turn, the rotor 80 is then turned from its neutral position in a clockwise direction as viewed in Fig. 3 and the conductive sleeve 50a in the brush holder 44 meets the advancing lobe 124 of the rotor cam 126 before the brush carrier is completely spring-returned to its neutral position, with the result that the closed right turn signal circuits are opened when the vehicle starts on its left turn.

For all intents and purposes, the conductor 82 may be completely circular without impairing the described operation of the switch, as will be readily understood. However, by providing the part-circular conductor 82 shown in Fig. 3, the present switch may be readily made to operate like the one shown in my prior Patent No. 1,910,869, May 23, 1933, in which the left or right turn signal circuits are also automatically closed when the vehicle negotiates a left or right turn. To accomplish this, it is merely necessary to bring the cams 104 and 104a out of the path of rotation of the conductive sleeves 50a, 50b, removing the cam 126 from the rotor and forcing both conductive sleeves 50a, 50b into their inner position in which the spring apexes 72 register with the notches 74 and the brushes 52 engage the periphery of the rotor 80.

The switch 22 may be mounted on the upturned flange 20 of the bracket 18 by means of a nut 134 (Fig. 4) which is received by the threaded portion 136 of the bearing sleeve 28 that projects through a hole in said bracket flange 20.

Mounted on the stub shaft 36 of the brush carrier 40 is a lever 138 (Fig. 1) which is connected by a link 140 with another lever 142 that is mounted on a switch actuator shaft 144. The switch actuator shaft passes upwardly through the steering gear housing and is suitably journalled in the hollow steering shaft (not shown) which in turn is journalled in the customary jacket tube 146 and carries a steering wheel at its upper end. The upper end of the switch actuator shaft 144 may have a manual actuator at the hub of the steering wheel as shown and described in my copending application, Serial No. 298,794, filed October 10, 1939. The levers 138 and 142 are preferably so coordinated that they rotate in a common plane at an approximate speed ratio of one to one so that the switch actuator shaft 144 has to be rocked approximately 30 degrees in either direction in order to set the switch.

Figure 2:
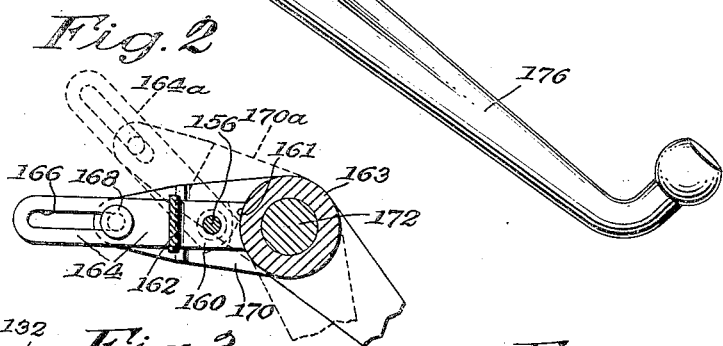
Fig. 2 is a section taken on the line 2—2 of Fig. 1.

Mounted on the rotor-carrying stub shaft 84 is a lever 150 (Fig. 1) which is connected by a link 152 with another lever 154, mounted on a shaft 156 which is suitably journalled in the legs 158 and 160 of a U-shaped extension 162 of the bracket 18. The free end of the leg 160 is preferably rounded at 161 to conform to the cylindrical extension 163 of the steering gear housing against which said leg 160 rests. The other end of the shaft 156 carries a lever 164 having a longitudinal slot 166 (see also Fig. 2) which receives a roller 168 of a lever 170, mounted on the serrated end of the customary trunnion shaft 172 of the steering gear housing assembly in close proximity to the usual ball arm 176 which is also carried by said trunnion shaft. The pivotal connections of the link 152 with the levers 150 and 154 are sufficiently loose to permit slight swivelling of said link when transmitting the rotary motion of the lever 154 to the lever 150. The levers 170 and 164 are so coordinated that they are longitudinally aligned as shown in full lines in Fig. 2 when the ball arm 176 is in an angular position corresponding to a straight direction of movement of the vehicle and the switch rotor 80 assumes the neutral position shown in Fig. 3. As best shown in Fig. 2, the shaft 156 is spaced from the trunnion shaft 172, wherefore rotation of the lever 170 from the full line position shown in Fig. 2 results in rotation of the lever 164 in the same direction and at a greater angular speed than that of the lever 170. This appears clearly from a comparison between the dotted line positions 170a and 164a of the levers 170 and 164 in Fig. 2 in which the lever 164 has been rotated clockwise from its full line position through a considerably larger angle than the lever 170. Of course, starting from the full line position shown in Fig. 2, the angular speed of lever 164 steadily decreases in comparison to that of lever 170, and it may well be that the angular speed of lever 164 becomes smaller than that of lever 170 near the limits of the rocking range of the latter which is determined by the possible rocking range of the ball arm 176. Thus, by properly coordinating the shafts 156 and 172 and the levers 164 and 170, the lever 164 may be rotated from the full line position in Fig. 2 in either direction at a considerably higher angular speed than that of the lever 170. This secures the advantage that even a comparatively slight deviation of the vehicle from its straight direction of movement at the start of a certain turn to be negotiated will cause release of the locked brush carrier of the switch in the corresponding active position and advance the rotor conductor sufficiently to insure continued engagement between the latter and the respective brush 52 while the brush carrier is spring-returned to its neutral position. On the other hand, if the driver has set the switch for the indication of a left turn, for instance, and then makes a right turn, the closed left turn signal circuits are opened on slight deviation of the vehicle from its straight direction of movement at the start of the right turn. If the switch performs automatically as was herein suggested, the greater angular speed of the lever 164 secures the further advantage that the rotor conductor 82 engages one of the brushes 52 very soon after the vehicle deviates from its straight direction of movement at the start of a turn of the vehicle and closes the corresponding signal circuits.

I claim:

1. The combination with a steering gear housing assembly in an automotive vehicle including a trunnion shaft of which an end projects from one end of said housing, and a signal switch adjacent the other end of said housing and having a rotatable actuator shaft of a driving connection between said actuator shaft and trunnion shaft end such that the former is rotated in opposite directions on rotation of the latter in opposite directions, said connection including another rotatable shaft parallel to the trunnion shaft. and drivingly connected with said actuator shaft at a substantially uniform speed ratio, and motion-transmitting elements between said other shaft and trunnion shaft end so cooperating that said other shaft is rotated in either direction from a position corresponding to a straight direction of movement of the vehicle at an angular speed which is greater than that of said trunnion shaft and decreases gradually.

2. The combination set forth in claim 1, in which said elements comprise a lever mounted on said trunnion shaft end and carrying a roller, and another lever mounted on said other shaft and having a longitudinal slot receiving said roller, said levers being so coordinated that they are longitudinally aligned when the trunnion shaft is in a position corresponding to a straight direction of movement of the vehicle.

3. The combination set forth in claim 1, in which said elements comprise a first lever mounted on said trunnion shaft end and carrying a roller at a greater distance from the trunnion shaft axis than the distance between the axes of said other shaft and trunnion shaft, and another lever mounted on said other shaft between said first lever and said other housing end and having a longitudinal slot receiving said roller, said levers being so coordinated that they are longitudinally aligned when the trunnion shaft is in a position corresponding to a straight direction of movement of the vehicle.

4. The combination set forth in claim 1, further comprising a bracket which carries said switch and is mounted on said other housing end and rotatably supports said other shaft.

5. The combination set forth in claim 1, further comprising a bracket of sheet metal on which the switch is mounted and which is itself mounted on said other housing end and has a U-shaped extension whose parallel legs have holes wherein said other shaft is journalled.

PAUL WEIEN.